United States Patent [19]

Iwasa

[11] Patent Number: 5,123,988
[45] Date of Patent: Jun. 23, 1992

[54] PROCESS OF PRODUCING A RUBBER-EXTRUDED ARTICLE

[75] Inventor: Tadanobu Iwasa, Aichi, Japan

[73] Assignee: Toyoda Gosei Co., Ltd., Nishikasugai, Japan

[21] Appl. No.: 720,627

[22] Filed: Jun. 25, 1991

[30] Foreign Application Priority Data

Jun. 29, 1990 [JP] Japan ............... 2-172894

[51] Int. Cl.⁵ ............................. B29B 47/02
[52] U.S. Cl. .................. 156/244.11; 156/244.12; 156/244.23; 156/244.24; 156/244.25; 156/244.27; 156/297; 156/299; 264/149; 264/177.1; 264/177.2; 428/122
[58] Field of Search ......... 156/244.11, 244.23, 156/244.12, 244.24, 244.25, 297, 299, 244.27; 264/149, 167, 177.1, 45.9, 46.1, 46.4, 177.2; 428/122

[56] References Cited

U.S. PATENT DOCUMENTS

| | | | |
|---|---|---|---|
| 2,794,757 | 6/1957 | Bright | 428/122 |
| 3,068,136 | 12/1962 | Reid | 156/244.25 |
| 4,722,818 | 2/1988 | Zoller | 264/177.2 |
| 4,783,931 | 11/1988 | Kirkwood | 428/122 |

FOREIGN PATENT DOCUMENTS

| | | | |
|---|---|---|---|
| 158216 | 9/1983 | Japan | 156/244.11 |
| 62-88655 | 6/1987 | Japan | |
| 2172640 | 9/1986 | United Kingdom | 428/122 |

*Primary Examiner*—Caleb Weston
*Attorney, Agent, or Firm*—Cushman, Darby & Cushman

[57] ABSTRACT

A process for producing a rubber extruded article comprising a main body made of EPDM, by finishing the surface of the article with a cloth-like surface, by attaching cloth to a designated surface of the rubber substrate, said process comprising forming the main body of an extruded article by extrusion while forming a first adhesive layer comprising a blended rubber composed of 40 to 80% by weight of NBR, 20 to 60% by weight of EPDM and 0 to 35% by weight of SBR, or a composition of the blended rubber on the designated surface of the rubber substrate, subjecting the main body of the extruded article to a vulcanization step, and then pressure-bonding a long, narrow strip of cloth lined with a second adhesive layer of a thermoplastic resin to the first adhesive layer, and fusing the second adhesive layer together with the first adhesive layer by heating to cause the complete union of the strip of cloth to the rubber extruded article.

18 Claims, 3 Drawing Sheets

PROCESS OF PRODUCING A RUBBER-EXTRUDED ARTICLE

BACKGROUND OF THE INVENTION

1. Field of the Invention

The present invention relates to a process for producing a rubber extruded article in which the main body of the article is made of EPDM. In particular, it relates to a process for producing a rubber extruded article which is suitable for making cloth-like surfaces of internal automotive rubber products such as weather strip, trim and the like.

A list of the abbreviations of polymers and plasticizers used in the present specification is shown below.

NBR—nitrile-butadiene rubber.
EPDM—ethylene-propylene rubber (sulfurvulcanizable type).
SBR—styrene-butadiene rubber.

2. Description of Related Art

An explanation is given below using the example of automobile door weather strips as rubber extruded articles, but in the present specification, the word "extruded articles" refers not only to automobile door weather strips.

Conventionally, many extruded articles such as weather strips are made of EPDM. EPDM shows good weather resistance, ozone resistance, heat resistance, etc.

Because of the recent growing demand for improvement in the decorative design of automobiles, it is often desirable that the exposed surface of a weather strip have the same cloth-like surface as that of the interior trim.

There is a conventional method of attaching cloth to the surface to be decorated (see Japanese Utility Model Registration Unexamined Publication No. 62-88655). The above method, however, is disadvantageous for the following reasons. In order to make a surface of a rubber extruded article, the surface of the article after vulcanization must be subjected to a large number of steps such as buffing, defatting, primer coating, coating with an adhesive, attachment of cloth, curing of the adhesive, etc. Therefore, the productivity is not satisfactory.

In view of such conditions, the present invention is intended to provide a high-productivity process for producing a rubber extruded article with a cloth-like surface by attaching cloth to the surface of a rubber substrate made of EPDM.

SUMMARY OF THE INVENTION

This application relates to a process for producing a rubber extruded article wherein the main body of the extruded article is made of EPDM, and the surface of the article is made cloth-like by attaching cloth to the surface of the article, said process comprising forming the main body of the extruded article by extrusion while forming a first adhesive layer comprising a blended rubber composed of 40 to 80% by weight of NBR, 20 to 60% by weight of EPDM and 0 to 35% by weight of SBR, or a composition of the blended rubber on the surface to be decorated of the rubber substrate, subjecting the main body of the extruded article to a vulcanization step, and then pressure-bonding a long, narrow strip of cloth having a second adhesive layer formed on its inside surface which attaches to the first adhesive layer, and fusing the first adhesive layer together with the second adhesive layer by heating to bring about a complete union of the strip of cloth to the rubber extruded article to form a single body.

This invention is accomplished with a small number of steps which can be productively and economically accomplished when compared with conventional processes.

DETAILED DESCRIPTION OF THE DRAWINGS

Figure 1:
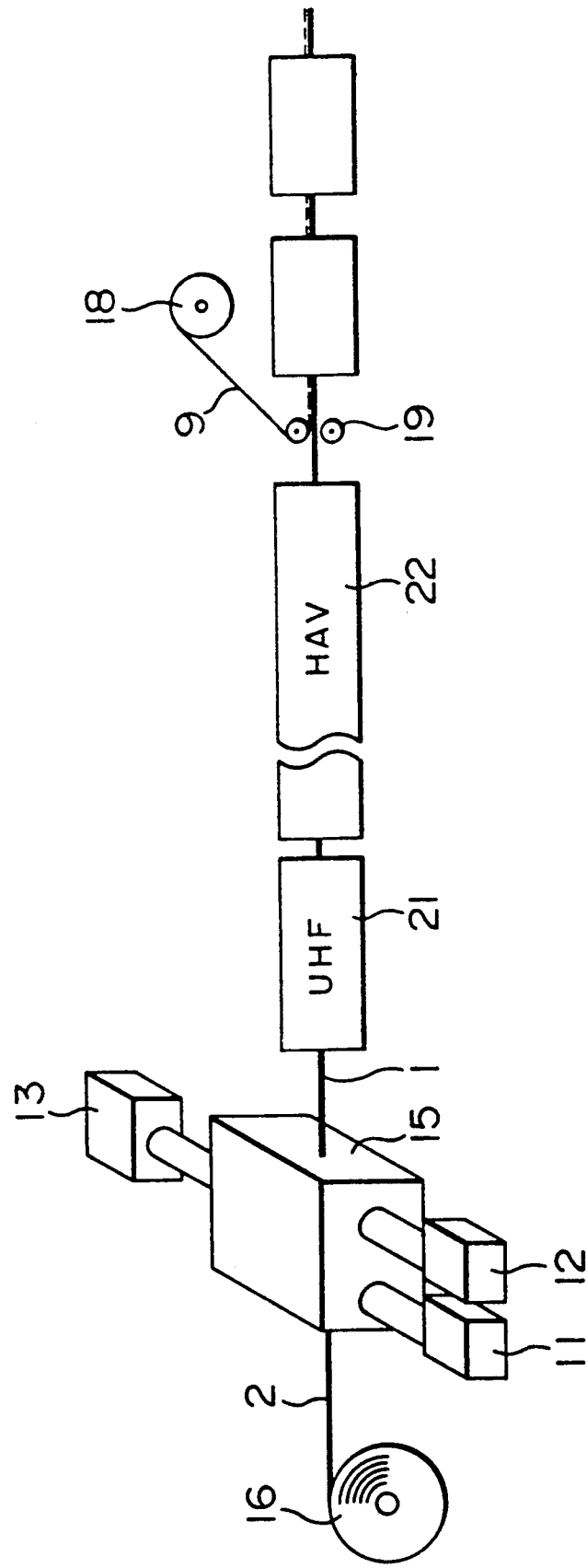
FIG. 1 is a schematic flow diagram showing one example of the process for producing a rubber extruded article of the present invention.

1—main body of weather strip,
3—solid rubber portion,
5—sponge rubber portion,
7—first adhesive layer,
8—second adhesive layer,
9—long, narrow strip of cloth,
18—feed roll for long, narrow strip of cloth,
19—press roll for long, narrow strip of cloth
22—hot-air vulcanization tank (HAV tank),
D—surface to be decorated.

DETAILED DESCRIPTION OF THE PREFERRED EMBODIMENTS

The means of the present invention is illustrated below in detail. In the following illustration, the units in blending, percents and parts, are all by weight unless otherwise specified.

(1) Fundamentally, the process of the present invention is a process for producing a rubber extruded article comprising a main body of extruded article 1 made of EPDM, in which the surface to be decorated D of the rubber extruded article is finished to be cloth-like by attaching a long, narrow strip of cloth 9 to the surface to be decorated of the rubber substrate, thus forming the solid rubber portion 3 in the example shown in the figures.

The example shown in the figures is a door weather strip in which the main body of extruded product 1 is composed of a solid rubber portion 3 and a sponge rubber portion 5 each of which is made of EPDM.

Here, EPDM is a copolymer obtained by copolymerizing ethylene and propylene with a slight amount of a third component non-conjugated diene (e.g. ethylidenenorbornene, dicyclopentadiene, or 1,4-hexadiene). The third component serves to introduce a double bond into a side chain and thereby make the copolymer sulfur-vulcanizable. The copolymer is usually blended with supplementary materials such as reinforcing filler (carbon black or white carbon), plasticizers, lubricants, agents for vulcanization, etc. Tables 1 and 2 show examples of formulas for preferred embodiments of the EPDM solid rubber composition and the EPDM sponge rubber composition, respectively, which can be used in the present invention.

Figure 2:
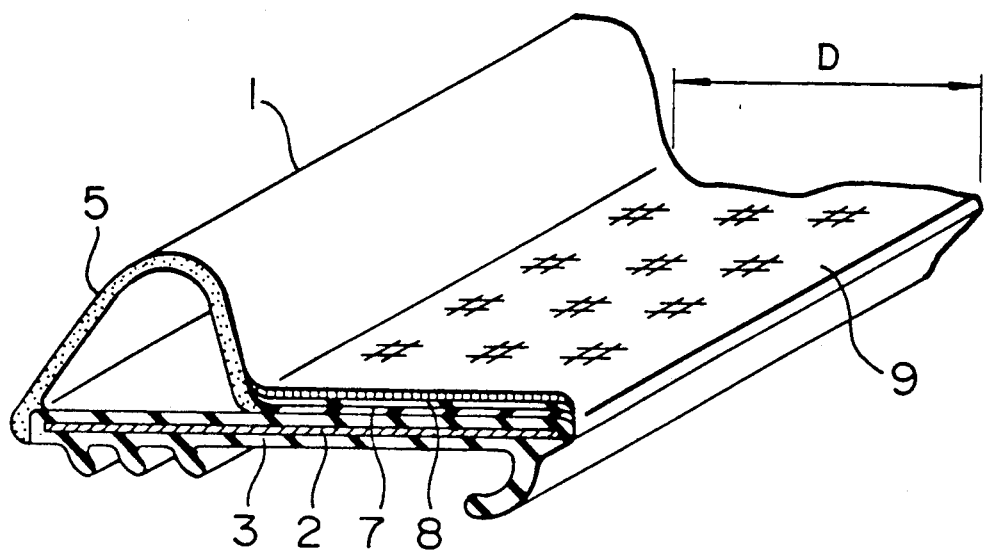
FIG. 2 is a sectional perspective view showing on example of weather strip finished to be made cloth-like by the process of the present invention.
Figure 3:
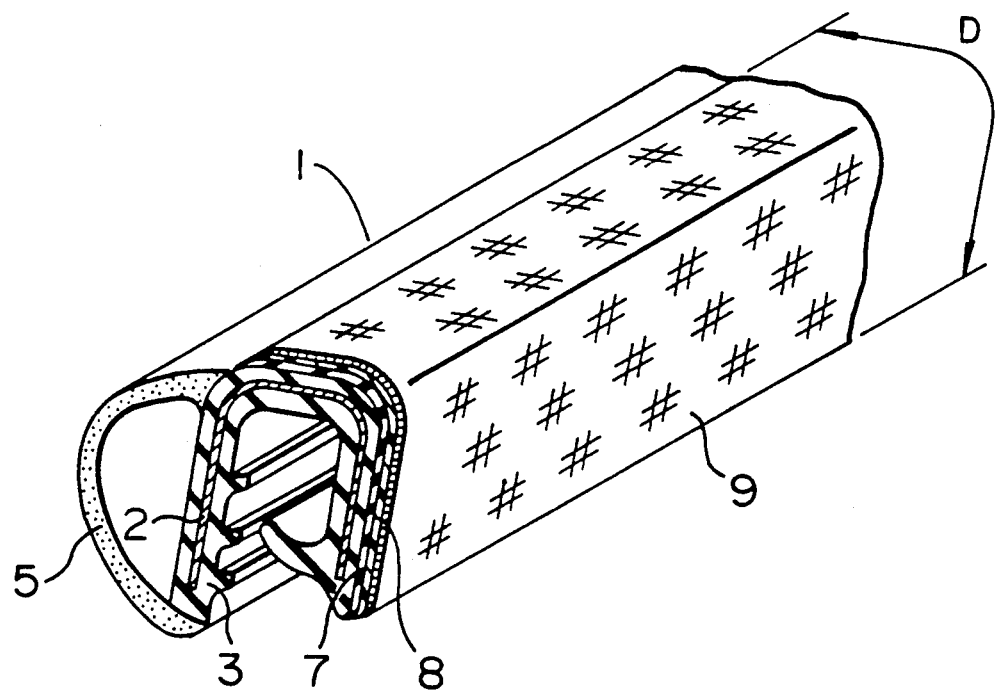
FIG. 3 is a sectional perspective view of the weather strip shown in FIG. 2 whose trim portion is bent.
Figure 4:
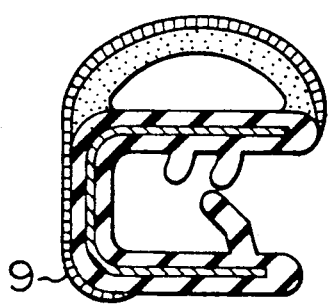
FIGS. 4 to 9 are cross-sectional views of various types of weather strips to which the present invention is applicable.
Figure 5:
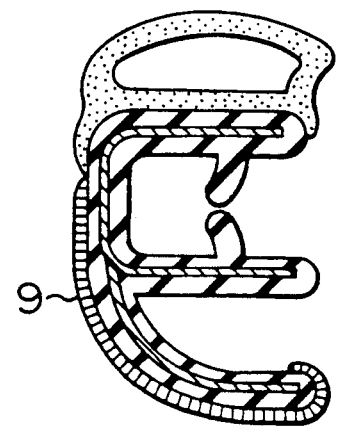
Figure 6:
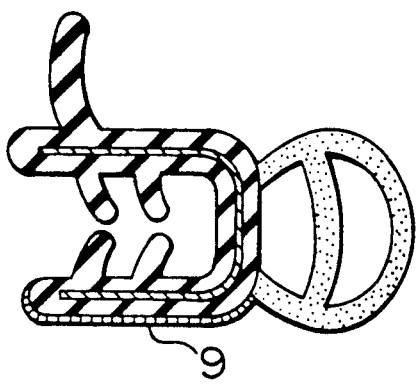
Figure 7:
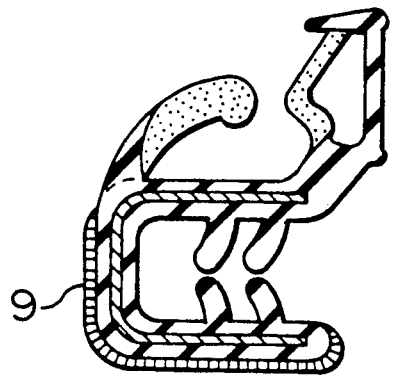
Figure 8:
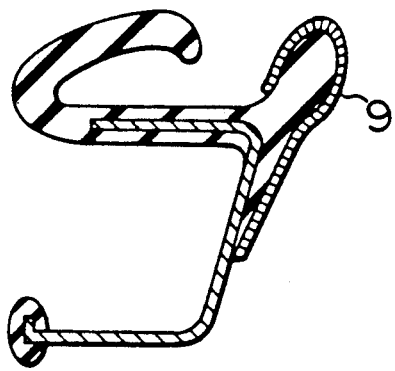
Figure 9:
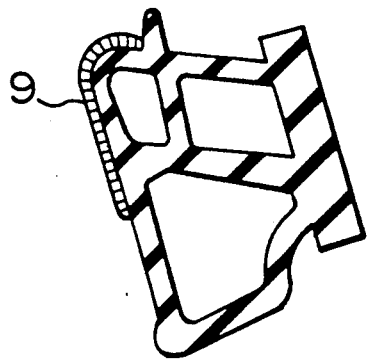

(2) A first characteristic of the production process of the present invention is as follows. As shown in FIGS. 2 and 3, a main body of extruded article 1 is formed by extrusion while forming a first adhesive layer 7 of the specific blended rubber or composition thereof described below, on the surface to be decorated D of a solid rubber portion (a rubber substrate) 3. That is, the solid rubber portion 3, sponge rubber portion 5 and first adhesive layer 7 of the main body of weather strip 1 are formed by co-extrusion by using respective materials for them.

In detail, as shown in FIG. 1, the co-extrusion is carried out by connecting extruders 11, 12 and 13 for the solid rubber portion, the sponge rubber portion and the first adhesive layer, respectively, to an extrusion head 15 for giving multiple colors. A feed roll 16 for an insert 2 is placed before the extrusion head 15.

The blended rubber is composed of 40 to 80% of NBR, 20 to 60% of EPDM and 0 to 35% of SBR. This blended rubber is the same as that disclosed in Jap. Pat. Appln. Kokai (Laid-Open) No. 62-172043. It is usually prepared by emulsion polymerization.

a) When the proportion of NBR is less than 40%, the adhesive properties to a second adhesive layer (formed of a thermoplastic resin) 8 are not sufficient. When it exceeds 80%, the adhesive properties with the solid rubber portion made of EPDM and the ozone resistance are not sufficient.

b) When the proportion of EPDM is less than 20%, the ozone resistance is low. When it exceeds 60%, the adhesive properties with the second adhesive layer 8 formed of a thermoplastic resin are not good.

c) When the proportion of SBR exceeds 35%, the adhesive properties with the second adhesive layer 8 formed of a thermoplastic resin are not sufficient and moreover the ozone resistance is low. Although the proportion of SBR may be 0%, blending of SBR in a proportion of 2% or more improves the adhesive properties with the solid rubber portion (the EPDM substrate) and hence is desirable.

d) The aforesaid blended rubber is usually blended with supplementary materials such as reinforcing filler (carbon black or white carbon), plasticizers, lubricants, agents for vulcanization, and optionally colorants. Table 3 shows formulas for preferred embodiments of the solid rubber composition and the sponge rubber composition, which may contain carbon black and can be used in the present invention. In this case, when the thickness of the first adhesive layer 7 is adjusted to less than 0.5 mm to enable supplementary materials such as vulcanizing agent to transfer from the solid rubber portion 3, blending of the supplementary materials becomes unnecessary. Therefore, such an effect is desirable.

e) The thickness of the first adhesive layer 7 is adjusted to 0.1 to 2 mm. When it is less than 0.1 mm, the desired adhesive effect is unlikely to be obtained. When it exceeds 2 mm, the cost of the materials is increased and, moreover, characteristics of the solid rubber portion are lost. Therefore, a thickness of less than 0.1 mm or greater than 2 mm is not desirable.

(3) The main body of extruded article 1 which has the first adhesive layer 7 is subjected to a vulcanization step to vulcanize the first adhesive layer 7 together with the main body of extruded article.

In the examples shown in the figures, the vulcanization step is performed in a UHF (Ultra High Frequency) tank 21 and an HAV (Hot Air Vulcanization) tank 22. In the UHF tank, rubber is vulcanized by irradiating it with an electric wave of ultra high frequency thereby heating it inwardly. In the HAV tank, rubber is vulcanized by heating it with hot air. According to the vulcanization step shown in the figure, rubber is first heated efficiently in the UHF tank and then further heated with hot air and maintained at the temperature for a required period, and as a result, vulcanized. The conditions of the vulcanization are usually 200° C.×3-10 minutes.

(4) Subsequently, a long, narrow strip of cloth which has previously been lined with a second adhesive layer 8 is pressure-bonded to the first adhesive layer 7 of the main body of extruded article 1, which has been subjected to the vulcanization step.

a) The kind of fabric used for the strip of cloth 9 is not critical and may be woven fabric, non-woven fabric, etc. The kind of fiber constituting the fabric of the strip of cloth is also no critical and polyester fiber, nylon fiber or the like is usually used, because they have good weather resistance, abrasion resistance and are economical.

b) As the second adhesive layer 8, a layer formed of a thermoplastic resin chemically similar to the fiber constituting the strip of cloth 9 is usually used. For example, when the strip of cloth 9 is composed of polyester fiber, "R-248" (manufactured and sold by Toray Industries, Inc.) can be used as adhesive, because "R-248" is a thermoplastic polyester.

c) The lining of the cloth strip with a second adhesive is conducted by coating or pressure-bonding by heating an adhesive material which is initially in the form of a filmy material. The thickness of the second adhesive layer 8 is adjusted to 20 to 100 μm. When it is less than 20 μm, a sufficient adhesive strength is unlikely to be obtained. When it exceeds 100 μm, the adhesive strength is deteriorated. Moreover, the material cost is increased.

In the example shown in FIG. 1, figures, the pressure-bonding step described above is carried out by pressure-bonding the long, narrow strip of cloth 9 fed from a feed roll 18 to the second adhesive layer 8 by means of a pair of press rolls 19.

d) Since the pressure-bonding step is usually carried out immediately after the vulcanization step, the second adhesive layer 8 is fused together with the first adhesive layer 7 by heat left over in the vulcanization step. When the thermal efficiency is not regarded as important, the two adhesive layers may be fused together with each other by heating the first adhesive layer 7 and/or the second adhesive layer 8 in a subsequent step.

After the pressure-bonding of the strip of cloth to the rubber article or substrate, the resulting assembly is subjected to a water-cooling step and a bending step, as in the example shown in FIG. 1, to be processed into a weather strip such as is shown in FIG. 3.

In the production process of the present invention, successive steps of formation of a weather strip by extrusion and vulcanization can be employed, so that the productivity can be improved. That is, it is sufficient that after the step of forming by extrusion the main body of extruded article 1 which has the first adhesive layer 7 and the step of vulcanizing this main body of extruded article 1, the strip of cloth 9 previously lined with the second adhesive layer 8 is pressure-bonded to the first adhesive layer 7, after which the two layers are fused by heating.

The production process of the present invention is applicable not only to the above-mentioned weather strip shown in FIGS. 2 and 3 but also to various weather strips, for example, those shown in FIGS. 4 to 9.

As described above, in the present inventive process for producing a rubber extruded article comprising a main body of extruded article made of EPDM, a surface of the rubber extruded article is given a cloth-like finish by attaching cloth to the surface of the rubber substrate. This production process is characterized by the formation of a main body of extruded article by extrusion. The extruded article has a surface which is covered by a first adhesive layer comprising a blended rubber composed of 40 to 80% of NBR, 20 to 60% of EPDM and 0 to 35% of SBR, or a composition of the blended rubber. The main body of the extruded article is then subjected to a vulcanization step. Next, a long, narrow strip of cloth having a second adhesive layer of a thermoplastic resin formed on the inner side is pressure-bonded to the first adhesive layer. Finally, the second adhesive layer is fused with the first adhesive layer by heating so that the strip is completely attached to the rubber extruded article and the cloth and the article form one body. By virtue of this characteristic, the production process has the following effects.

For finishing a surface of a rubber extruded article to obtain a cloth-like finish, it has been necessary conventionally to subject the surface to a large number of steps such as buffing, defatting, primer coating, coating with an adhesive, attachment of cloth, curing of the adhesive, etc.

As compared with such a conventional process, the process of the present invention involves the formation by extrusion of a main body of extruded article 1 having a first adhesive layer 7. The formation step is followed by the step of subjecting the main body of the extruded article 1 to a vulcanization step. Next, a long, narrow strip of cloth 9 lined with a second adhesive layer 8 is pressure-bonded to the first adhesive layer 7. Finally, the adhesive layers are fused with each other by heating. By this method the productivity can be greatly improved.

The first adhesive layer 7, the second adhesive layer 8 and the strip of cloth 9 are strongly bonded to the rubber substrate 3 of the main body of the extruded article. The resulting rubber extruded article has a good practical strength, as described in the example given hereinafter.

To achieve a finishing layer having various cloth-like portions with a predetermined length in the direction of extrusion and with predetermined colors which are alternately different, or, similarly, a finishing layer having various cloth-like portions in parallel with the direction of extrusion, it is sufficient that long, narrow strips of cloth are pressure-bonded to the second adhesive layer 8 either parallel to one another or in an alternate arrangement with one another. Therefore, the productivity is high.

EXAMPLES

An example and a comparative example are given to confirm the adhesive strength between a main body of extruded article and a long, narrow strip of cloth when the process of the present invention is used.

A weather strip having the section shown in FIG. 2 (without the second adhesive layer 8 and the long, narrow strip of cloth 9 and having a thickness of the first adhesive layer of 0.4 mm) was formed by extrusion (extrusion rate: 5 m/min) with a cross-head type extruder (cylinder bore: 60 mmφ, compression ratio: 1.5) by the use of rubber materials for the solid rubber portion 3, the sponge rubber portion 5 and the first adhesive layer 7 which were made according to the formulas shown in Tables 1, 2 and 3, respectively. Then, the extruded product was introduced into an HAV tank, and the main body 1 and the first adhesive layer 8 were vulcanized under conditions of 200° C. × 10 min. While the extruded product after the vulcanization was still hot, a long, narrow strip of cloth (width: 40 mm, thickness: 2 mm) 9 of polyester woven fabric (plain weave) which had been lined with a second adhesive layer (formed of a thermoplastic resin) 8 was pressure-bonded to the first adhesive layer 7. The second adhesive layer 8 and the first adhesive layer 7 were then fused together by heating. Thereafter, the extruded product was cooled to obtain a product (a test article) of the example.

The product of the example thus prepared was allowed to stand at room temperature for 24 hours. Then, the adhesive strength of the strip of cloth 9 to the substrate (rubber extruded product) was measured by a 180° peel test (rate of pulling: 10 cm/min) while holding the strip of cloth 9, to find that the peel strength was 2.3 kg/cm (the fracture of the second adhesive layer) when the first adhesive layer was formed of the solid rubber composition. The peel strength was 1.0 kg/cm (the fracture of the substrate) when the first adhesive layer was formed of the sponge rubber composition.

TABLE 1

| EPDM (JSR EP57C)[*1] | 100 |
|---|---|
| MAF (carbon black) | 130 |
| Process oil (paraffinic) | 100 |
| Zinc oxide | 5 |
| Stearic Acid | 1 |
| Dehydrating agent (CaO) | 5 |
| Vulcanization accelerator[*2] | 3.5 |
| Sulfur | 2 |

[*1]Mfd. by Japan Synthetic Rubber Co., Ltd. The third component non-conjugated diene is ethylidenenorbornene.
[*2]Mixture of mercaptobenzothiazole, zinc di-n-butyldithiocarbonate, tetramethylthiuramdisulfide and dipentamethylenethiuramtetrasulfide.

TABLE 2

| EPDM (JSR EP57C)[*1] | 100 |
|---|---|
| MAF (carbon black) | 80 |
| Calcium carbonate | 20 |
| Process oil (paraffinic) | 65 |
| Zinc oxide | 5 |
| Stearic Acid | 1 |
| Dehydrating agent (CaO) | 5 |
| Foaming agent (OBSH-based)[*2] | 3 |
| Vulcanization accelerator | 3.5 |
| Sulfur | 1.5 |

[*1]Mfd. by Japan Synthetic Rubber Co., Ltd.
[*2]OBSH: p,p'-Oxybisbenzenesulfonylhydrazine

TABLE 3

|  | Solid | Sponge |
|---|---|---|
| NBR (JSR N2305)[*1] | 63 | 63 |
| EPDM (JSR EP35)[*1] | 27 | 27 |
| SBR (JSR 1502)[*1] | 10 | 10 |
| Stearic acid | 1 | 1 |
| Zinc oxide | 5 | 5 |
| Plasticizer (DOP)[*2] | 25 | 25 |
| Magnesium silicate (Mistron Vapor)[*3] | 75 | 75 |
| Polyethylene (PEG 4000)[*4] glycol | 2 | 2 |
| Dehydrating agent (CaO) | 5 | 5 |
| Vulcanization accelerator | 3.2 | 3.2 |
| Sulfur | 1.5 | 1.5 |

TABLE 3-continued

|  | Solid | Sponge |
|---|---|---|
| Foaming agent (OBSH) | — | 3 |

[1]Mfd. by Japan Synthetic Rubber Co., Ltd.
[2]DOP: Dioctylphthalate
[3]A kind of talc mfd. by Sierra Talc. Co.
[4]Mol. wt. range 3000-3700

What is claimed is:

1. A process for producing an extruded rubber article with a cloth-like finish comprising the steps of
   (a) extruding a rubber substrate;
   (b) applying a first adhesive layer on a side of the substrate;
   (c) subjecting adhesive-coated substrate to vulcanization to bond the first adhesive layer to the substrate;
   (d) placing a strip of cloth having a second adhesive layer on one side thereof on the substrate so that the first and second adhesive layers are in contact with each other; and
   (e) bonding the strip of cloth to the substrate by heating to fuse the first adhesive layer with the second adhesive layer.

2. A process according to claim 1 wherein the rubber article comprises EPDM.

3. A process according to claim 2 wherein EPDM is obtained by copolymerizing an ethylene and a propylene with a small amount of a non-conjugated diene.

4. A process according to claim 3 wherein the non-conjugated diene is a material selected from the group consisting of ethylidenenorbornene, dicyclopentadiene and 1,4-hexadiene.

5. A process according to claim 2 wherein, before the extruding step, the EPDM of the rubber substrate is blended with reinforcing filler, plasticizers, lubricants, and agents for vulcanization.

6. A process according to claim 1 wherein the first adhesive layer is a composition comprising from 40 to 80% by weight of NBR, from 20 to 60% by weight of EPDM, and from 0 to 35% by weight of SBR.

7. A process according to claim 6 wherein before the first adhesive layer is applied to the rubber substrate, the composition is prepared by emulsion polymerization as a blended rubber.

8. A process according to claim 6 wherein the composition is further comprised of reinforcing filler, plasticizers, lubricants, agents for vulcanization and colorants.

9. A process according to claim 1 wherein the second adhesive layer is a thermoplastic resin.

10. A process according to claim 9 wherein the thermoplastic resin comprises fibers chemically similar to fibers in the strip of cloth.

11. A process according to claim 1 wherein the steps (a) and (b) are performed by co-extruding a solid rubber portion, a sponge rubber portion, and the first adhesive layer.

12. A process according to claim 1 wherein the first adhesive layer has a thickness of from 0.1 mm to 2.0 mm.

13. A process according to claim 1 wherein the second adhesive layer has a thickness of from 20 to 100 μm.

14. A process according to claim 1 wherein the second adhesive layer is pressure-bonded by a pair of press rolls onto one side of the strip of cloth before being fused to the first adhesive layer.

15. A process according to claim 1 wherein the strip of cloth comprises woven or non-woven fabric.

16. A process according to claim 1 wherein the strip of cloth comprises polyester or nylon fiber.

17. A process according to claim 1 wherein the bonding step is accomplished with heat left over from the vulcanizing step.

18. A process according to claim 1 wherein after the bonding step, the extruded rubber article is subjected to a cooling step and a bending step.

* * * * *